United States Patent [19]
Cianfrocca, II

[11] Patent Number: 5,437,307
[45] Date of Patent: Aug. 1, 1995

[54] INTAKE BYPASS VALVE

[76] Inventor: Lawrence D. Cianfrocca, II, 402 Potomac Ave., Fairmont, W. Va. 26554

[21] Appl. No.: 265,812

[22] Filed: Jun. 27, 1994

[51] Int. Cl.⁶ .............................................. F16K 11/00
[52] U.S. Cl. ................... 137/878; 137/614.17
[58] Field of Search ............. 137/876, 878, 614.17, 137/625.47, 614.2

[56] References Cited

U.S. PATENT DOCUMENTS 1,053,327  2/1913  Stebbins ............................. 137/876
4,928,725  5/1990  Graves ....................... 137/614.17 X

*Primary Examiner*—John C. Fox

[57] ABSTRACT

An intake bypass valve comprising a primary tubular member, the member having a cavity at its central extent for the receipt of a spherical ball; a secondary tubular member coupled to the primary member, the secondary member adapted to direct the fluid from the central extent of the primary member; and a spherical ball rotatably positioned within the recess of the primary member, the ball adapted to be rotated about an axis, the ball having a central aperture therethrough with a diameter, the ball also having a clapper plate pivotally located in the wall of the ball, the clapper plate including a spring adapted to resiliently urge the plate into a closed position wherein its exterior surface is co-extensive with the wall of the ball, the plate adapted to be moved into an open position wherein the clapper plate is located within the aperture of the ball.

3 Claims, 4 Drawing Sheets

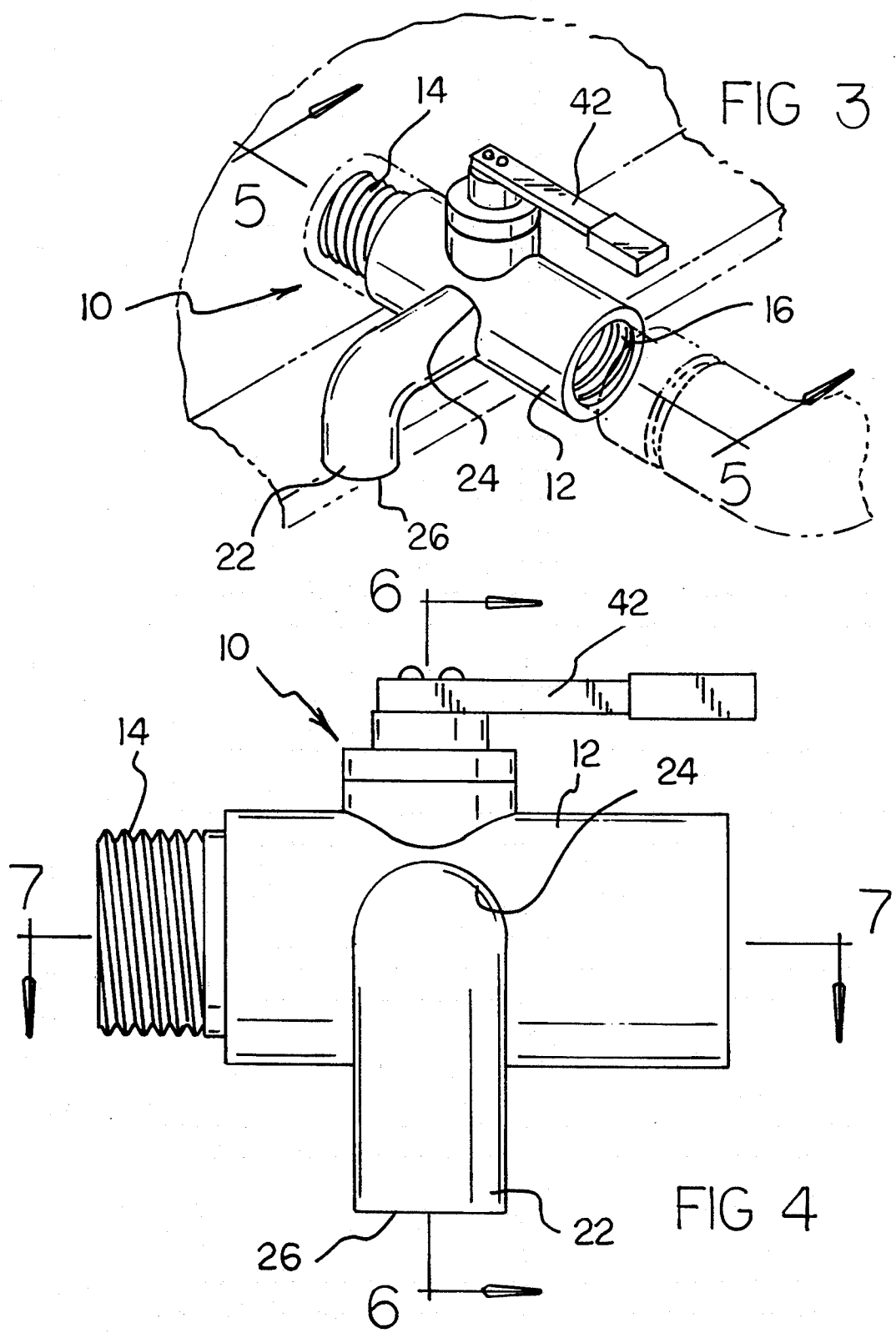

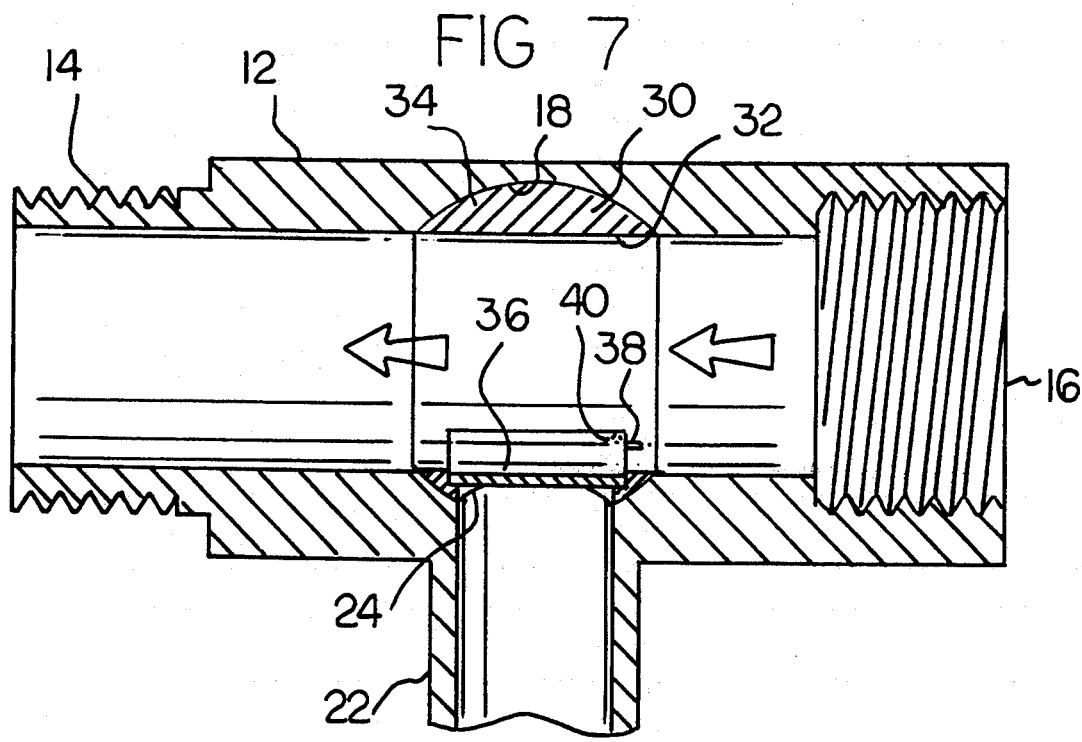
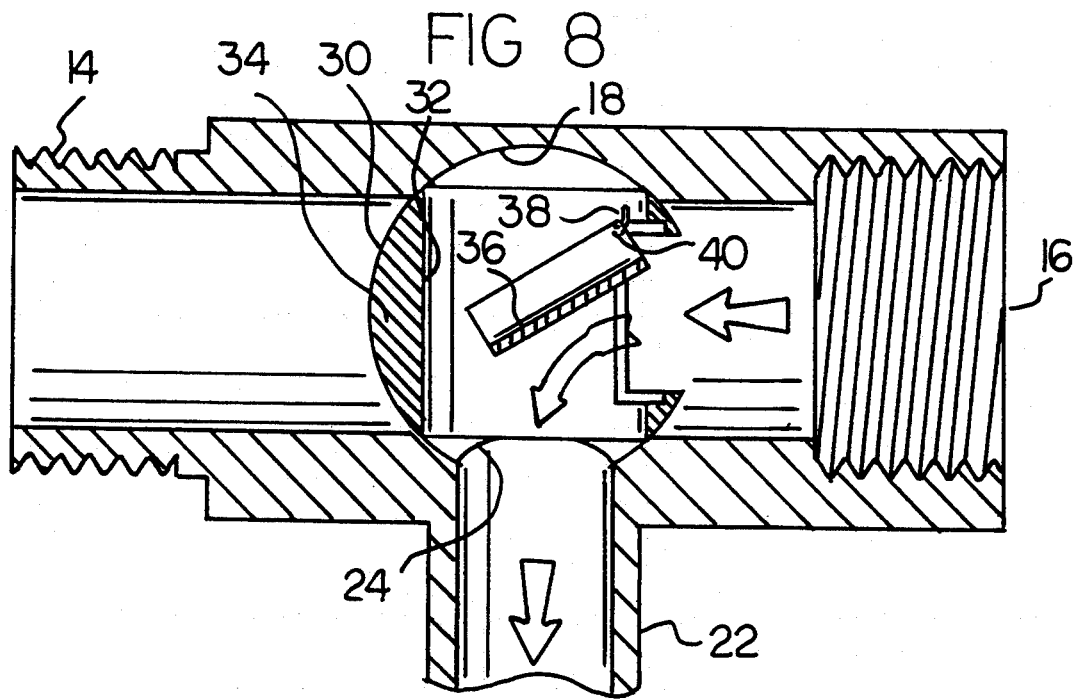

INTAKE BYPASS VALVE

BACKGROUND OF THE INVENTION

1. Field of the Invention

The present invention relates to a new and improved intake bypass valve and, more particularly, pertains to diverting the initial flow of water from a fire hydrant through a manually actuated ball-type valve to flush out the initial flow of dirty water.

2. Description of the Prior Art

The use of valves of a wide variety of designs and constructions is known in the prior art. More specifically, valves of a wide variety of designs and constructions heretofore devised and utilized for the purpose of diverting the flow of water between a plurality of flow paths for a variety of purposes are known to consist basically of familiar, expected, and obvious structural configurations, notwithstanding the myriad of designs encompassed by the crowded prior art which has been developed for the fulfillment of countless objectives and requirements.

The prior art discloses a large number of valves of a wide variety of designs and constructions. By way of example, U.S. Pat. No. 3,654,834 to Sifri discloses a fluid bypass valve.

U.S. Pat. No. 4,972,878 to Carlin discloses a firetruck valve.

U.S. Pat. No. 5,107,896 to Otto discloses a multifunctional valve.

U.S. Pat. No. 5,156,177 to Bishoff discloses a flow loading unloader valve.

Lastly, U.S. Pat. No. 5,178,185 to Stehling discloses a suction inlet valve for fire truck pumpers.

In this respect, the intake bypass valve according to the present invention substantially departs from the conventional concepts and designs of the prior art, and in doing so provides an apparatus primarily developed for the purpose of diverting the initial flow of water from a fire hydrant through a manually actuated ball-type valve to flush out the initial flow of dirty water.

Therefore, it can be appreciated that there exists a continuing need for a new and improved intake bypass valve which can be used for diverting the initial flow of water from a fire hydrant through a manually actuated ball-type valve to flush out the initial flow of dirty water. In this regard, the present invention substantially fulfills this need.

SUMMARY OF THE INVENTION

In view of the foregoing disadvantages inherent in the known types of valves of a wide variety of designs and constructions now present in the prior art, the present invention provides a new and improved intake bypass valve. As such, the general purpose of the present invention, which will be described subsequently in greater detail, is to provide a new and improved intake bypass valve and methods which have all the advantages of the prior art and none of the disadvantages.

To attain this, the present invention essentially comprises a new and improved intake bypass valve comprising, in combination, a primary tubular member with external threads at the output end and internal threads at the input end, the primary member having a cavity at its central extent for the receipt of a spherical ball; a secondary tubular member coupled to the primary member with its axis perpendicular to the axis of the primary member, the secondary member adapted to direct the fluid from the central extent of the primary member; a spherical ball rotatably positioned within the recess of the primary member, the ball adapted to be rotated about an axis perpendicular to the axis of the primary and secondary members, the ball having a central aperture therethrough with a diameter essentially equal to the interior diameter of the primary member thereby retaining an annular wall, the ball also having a clapper plate pivotally located in the wall of the ball, the clapper plate including a spring adapted to resiliently urge the plate into a closed position wherein its exterior surface is co-extensive with the wall of the ball, the plate adapted to be moved into an open position wherein the clapper plate is located within the aperture of the ball; and drive means to rotate the ball between a first orientation wherein the aperture of the ball has its axis co-extensive with the axis of the primary member and a second orientation wherein the aperture of the ball has its axis co-extensive with the axis of the secondary member with the flow of water from the source adapted to move the plate to interior of the ball for directing the flow of fluid through the secondary member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved intake bypass valve which has all the advantages of the prior art valves of a wide variety of designs and constructions and none of the disadvantages.

It is another object of the present invention to provide a new and improved intake bypass valve which may be easily and efficiently manufactured and marketed.

It is a further object of the present invention to provide a new and improved intake bypass valve which is of a durable and reliable construction.

An even further object of the present invention is to provide a new and improved intake bypass valve which is susceptible of a low cost of manufacture with regard to both materials and labor, and which accordingly is then susceptible of low prices of sale to the consuming public, thereby making such a intake bypass valve economically available to the buying public.

Still yet another object of the present invention is to provide a new and improved intake bypass valve which provides in the apparatuses and methods of the prior art some of the advantages thereof, while simultaneously overcoming some of the disadvantages normally associated therewith.

Even still another object of the present invention is to divert the initial flow of water from a fire hydrant through a manually actuated ball-type valve to flush out the initial flow of dirty water.

Lastly, it is an object of the present invention to provide an intake bypass valve comprising a primary tubular member, the member having a cavity at its central extent for the receipt of a spherical ball; a secondary tubular member coupled to the primary member, the secondary member adapted to direct the fluid from the central extent of the primary member; and a spherical ball rotatably positioned within the recess of the primary member, the ball adapted to be rotated about an axis, the ball having a central aperture therethrough with a diameter, the ball also having a clapper plate pivotally located in the wall of the ball, the clapper plate including a spring adapted to resiliently urge the plate into a closed position wherein its exterior surface is coextensive with the wall of the ball, the plate adapted to be moved into an open position wherein the clapper plate is located within the aperture of the ball.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective illustration of the preferred embodiment of the intake bypass valve constructed in accordance with the principles of the present invention.

FIG. 4 is a side elevational view of the valve shown in FIG. 3.

FIG. 7 is a cross-sectional view taken along line 7—7 of FIG. 4.

FIG. 8 is a cross-sectional view similar to that of FIG. 7 but showing the valve in an alternate orientation.

The same reference numerals refer to the same parts throughout the various Figures.

DESCRIPTION OF THE PREFERRED EMBODIMENT

Figure 1:
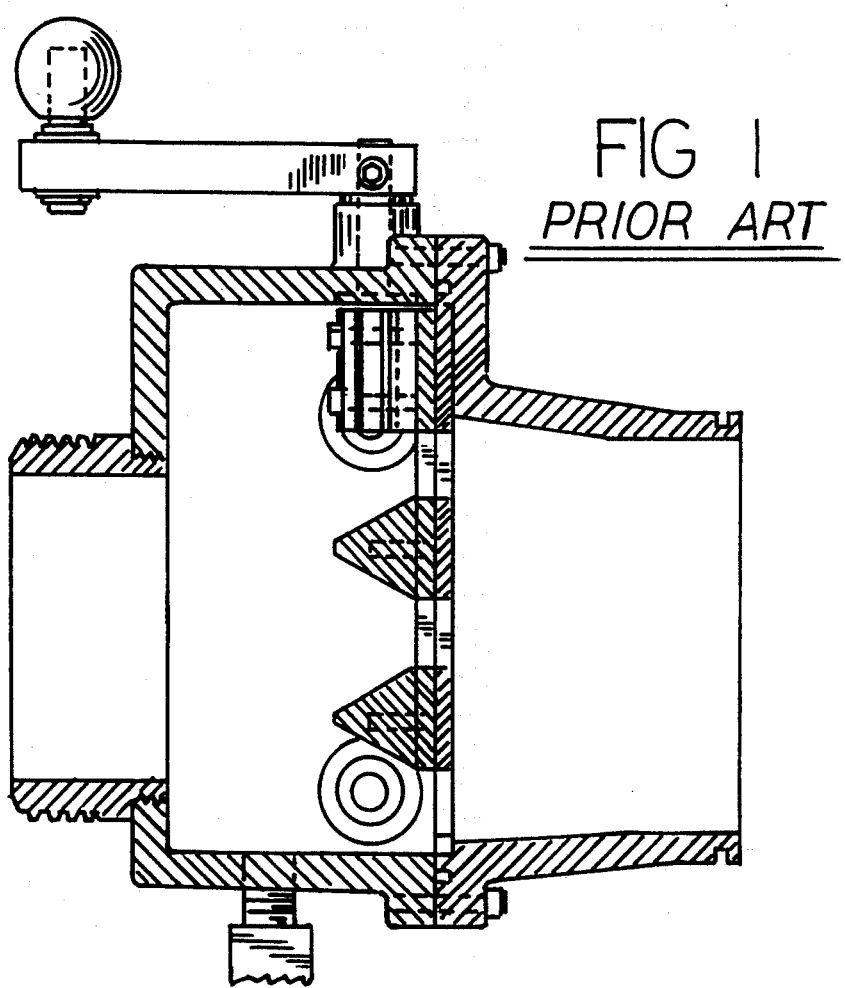
FIG. 1 is a cross-sectional view of a prior art type valve.
Figure 2:
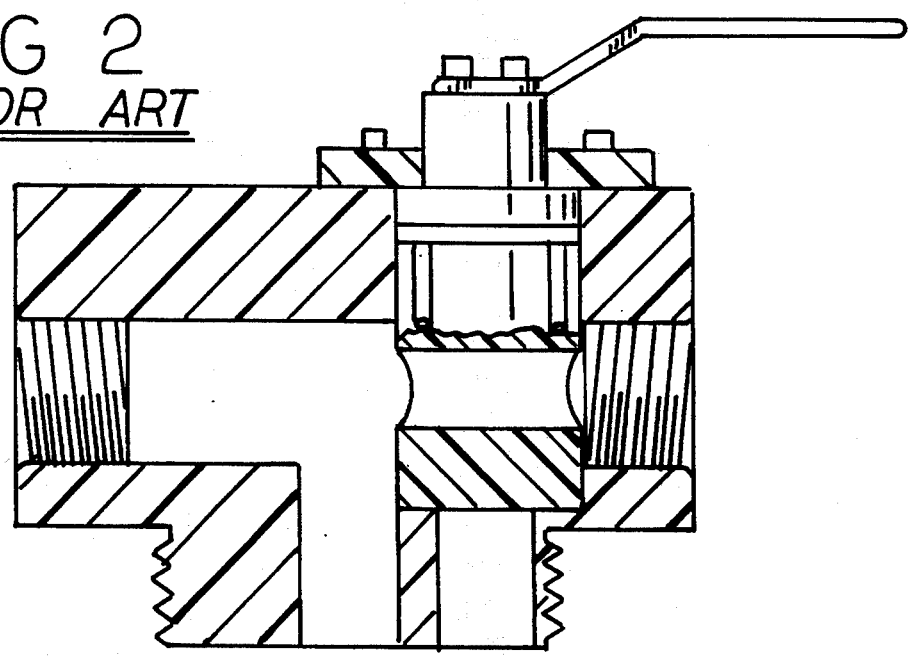
FIG. 2 is a cross-sectional view of another type of bypass valve.
Figure 5:
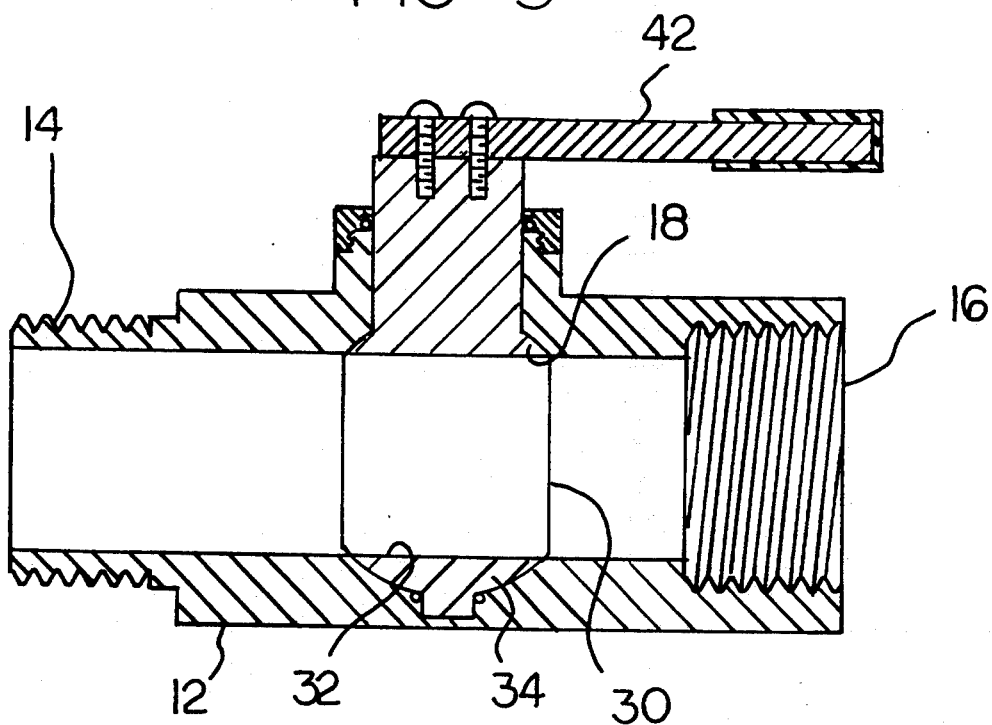
FIG. 5 is a cross-sectional view taken along line 5—5 of FIG. 3.
Figure 6:
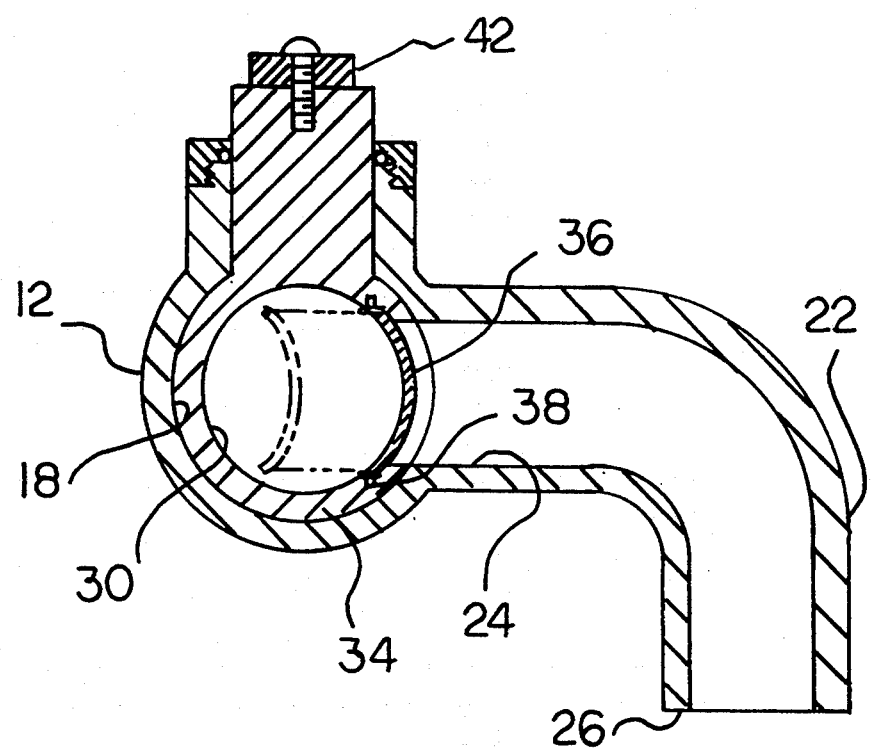
FIG. 6 is a cross-sectional view taken along line 6—6 of FIG. 4.

With reference now to the drawings, and in particular to FIGS. 1 through 8 thereof, the preferred embodiment of the new and improved intake bypass valve embodying the principles and concepts of the present invention and generally designated by the reference numeral 10 will be described.

The present invention, the new and improved intake bypass valve is a system comprised of a plurality of components. The components in their broadest context include a primary tubular member, a secondary tubular member, a spherical ball and drive means to rotate the ball. Each of the individual components is specifically configured and correlated one with respect to the other to attain the desired objectives.

The central component of the system 10 of the present invention is a primary tubular member 12. Such tubular member is formed with external threads 14 at the output end and internal threads 16 at the input end. The primary member is formed with a cavity 18 therein at its central extent. Such cavity has its faces of a spherical configuration for the receipt of a spherical ball therein.

In fluid communication with the primary tubular member is a secondary tubular member 22. The secondary member is coupled to the primary member. It has an input end 24 in fluid communication with the primary member. It also has an output end 26 remote therefrom. The axis of the secondary member is perpendicular to the axis of the primary member. The secondary member is adapted to direct a flow of fluid from the central extent emanating from the input end of the primary member to exterior of the secondary member and primary member.

Next provided is a spherical ball 30. Such ball is rotatably positioned within the recess of the primary member. The ball is adapted to be rotated about an axis perpendicular to the axis of the primary member and perpendicular to the axis of the secondary member.

The ball has a central aperture 32 therethrough. Such aperture has a diameter essentially equal to the interior diameter of the primary member. That portion of the ball remaining after the formation of the aperture constitutes an annular wall 34. The ball is also formed in its annular wall with a clapper plate 36. The clapper plate has at one edge thereof hinges 38 to pivotally secure the clapper to the wall. Also in association with the hinges is a spring 40. The spring is adapted to resiliently urge the plate into a closed position wherein its exterior surface is co-extensive with the exterior surface of the wall of the ball and the interior surface of the plate is essentially co-extensive with the interior surface of the wall of the ball. The plate is thus adapted to be moved between an open position when the clapper plate is located within the aperture of the ball upon the application of a force from conveyed fluids contacting the exterior surface of the clapper plate. The clapper plate is also positionable in a closed orientation wherein it is essentially co-extensive with the remaining portions of the wall of the ball.

The last component of the system 10 is a drive means in the form of a handle 42 exterior of the primary member and coupled to the ball to selectively effect its rotation about an axis of rotation perpendicular to the axis of the primary member and the axis of the secondary member. The handle thus may be used to orient the ball in a first orientation wherein the aperture of the ball has its axis coextensive with the axis of the primary member. The handle is also adapted to rotate the ball to a second orientation wherein its axis is co-extensive with the axis of the secondary member. In this second orientation the initial flow of water from a fire hydrant with dirty water will move through the input end of the primary member to the ball and then to contact and move the clapper plate to an orientation interior of the ball. In such orientation such water will be directed to flow through the secondary member. Such orientation is maintained for a period of time until the dirty water is disposed of through the secondary member as waste. Thereafter, the handle may be rotated 90 degrees to allow the clean water to flow from the fire hydrant through the primary member and aperture of the ball to the fire truck for being pumped for use in extinguishing fires.

After sitting idle for long periods of time, fire hydrants usually become clogged with dirt and rust. As a consequence of this, the water that is pumped from these hydrants is usually filled with dirt and rust as well. This can contaminate the pump and nozzles on the fire truck, causing a great deal of damage and significantly reducing the life of the equipment. The present invention is designed to work in conjunction with the existing water intake port currently incorporated on all fire trucks. Its purpose is to ensure that fouled water is not introduced to the pump or other working parts and nozzles.

The present invention is connected to the existing water inlet valve on the truck. It is a manually actuated ball-type valve which incorporates a spring-loaded internal "clapper plate" that is opened automatically by water pressure. The valve housing features a downward pointing discharge spout which is open to the atmosphere. When the fire hydrant is first connected to the present invention, the valve is open to the external discharge spout. The operator visually monitors the water flow. When the water becomes clear, the valve is closed, thereby directing the flow to the water pump.

With the use of the present invention only clean water will be fed to the pump and nozzles and their longevity will be increased. The extra time required to ensure this protection is minimal since only about the first twenty gallons of water are contaminated.

Without the present invention, the problems commonly experienced are damage to the internal seals and gaskets, and chipping of pump components. These problems result in truck "down time" for repairs, which is both a detriment to safety and a great expense to the community. The present invention should be a valuable acquisition for any firefighting organization.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved intake bypass valve comprising, in combination:

a primary tubular member having an input end and an output end and, therebetween, a central extent having an interior diameter and with a central axis and with external threads at the output end and internal threads at the input end, the primary tubular member having a cavity at its central extent for the receipt of a spherical ball;

a secondary tubular member having an input end and an output end and a central extent therebetween and with a central axis and coupled to the primary tubular member with its axis perpendicular to the axis of the primary tubular member, the secondary tubular member adapted to direct a flow of water from the central extent of the primary tubular member;

a spherical ball rotatably positioned within the cavity of the primary tubular member, the ball adapted to be rotated about an axis perpendicular to the axes of the primary and secondary tubular members, the ball having a central aperture therethrough with a diameter essentially equal to the interior diameter of the primary tubular member, the ball also having a wall and a clapper plate having an exterior surface pivotally located in the wall of the ball, the clapper plate including a spring adapted to resiliently urge the clapper plate into a closed position wherein its exterior surface is co-extensive with the wall of the ball, the clapper plate adapted to be moved into an open position wherein the clapper plate is located within the central aperture of the ball; and drive means to rotate the ball between a first orientation wherein the central aperture of the ball has its axis co-extensive with the axis of the primary tubular member and a second orientation wherein the central aperture of the ball has its axis co-extensive with the axis of the secondary tubular member with a flow of water from a source adapted to move the plate to interior of the ball for directing the flow of fluid through the secondary tubular member.

2. An intake bypass valve comprising:

a primary tubular member with an axis, the primary tubular member having a central extent with a cavity at its central extent for the receipt of a spherical ball;

a secondary tubular member with an axis coupled to the primary tubular member, the secondary tubular member adapted to direct a flow of fluid from the central extent of the primary tubular member; and a spherical ball rotatably positioned within the cavity of the primary tubular member, the ball adapted to be rotated about an axis, the ball having a central aperture therethrough with an axis, the ball also having a wall with a clapper plate pivotally located in the wall of the ball, the clapper plate including an exterior surface and a spring adapted to resiliently urge the clapper plate into a closed position wherein its exterior surface is co-extensive with the wall of the ball, the clapper plate adapted to be moved into an open position wherein the clapper plate is located within the aperture of the ball.

3. The apparatus as set forth in claim 2 and further including:

drive means to rotate the ball between a first orientation wherein the central aperture of the ball has its axis co-extensive with the axis of the primary tubular member and a second orientation wherein the aperture of the ball has its axis co-extensive with the axis of the secondary tubular member with a flow of fluid from source adapted to move the clapper plate into the central aperture of the ball for directing flow of fluid through the secondary tubular member.

* * * * *